United States Patent [19]
Grundy

[11] 3,794,932
[45] Feb. 26, 1974

[54] VITAL LEVEL DETECTOR

[75] Inventor: Reed H. Grundy, Murrysville, Pa.

[73] Assignee: Westinghouse Air Brake Company, Swissvale, Pa.

[22] Filed: Apr. 26, 1972

[21] Appl. No.: 247,552

[52] U.S. Cl. .............................. 331/110, 331/142
[51] Int. Cl. ............................................. H03b 5/26
[58] Field of Search ............ 331/110, 142; 307/318

[56] References Cited
UNITED STATES PATENTS
3,660,691  5/1972  Glawleschkoff ................... 307/318

OTHER PUBLICATIONS
Electronic Circuits Manual, Markus, 1971 Page 532
Qst, Pg. 18, 19, Nov. 1965

*Primary Examiner*—John Kominski
*Attorney, Agent, or Firm*—H. A. Williamson; J. B. Sotak

[57] ABSTRACT

This disclosure relates to a fail-safe level detecting circuit including a solid state amplifier having a feedback loop. The feedback loop includes a frequency determining twin-tee network and a voltage breakdown device. The amplifier produces a.c. oscillations when and only when the level of a d.c. voltage exceeds the threshold value of the voltage breakdown device.

10 Claims, 1 Drawing Figure

3,794,932
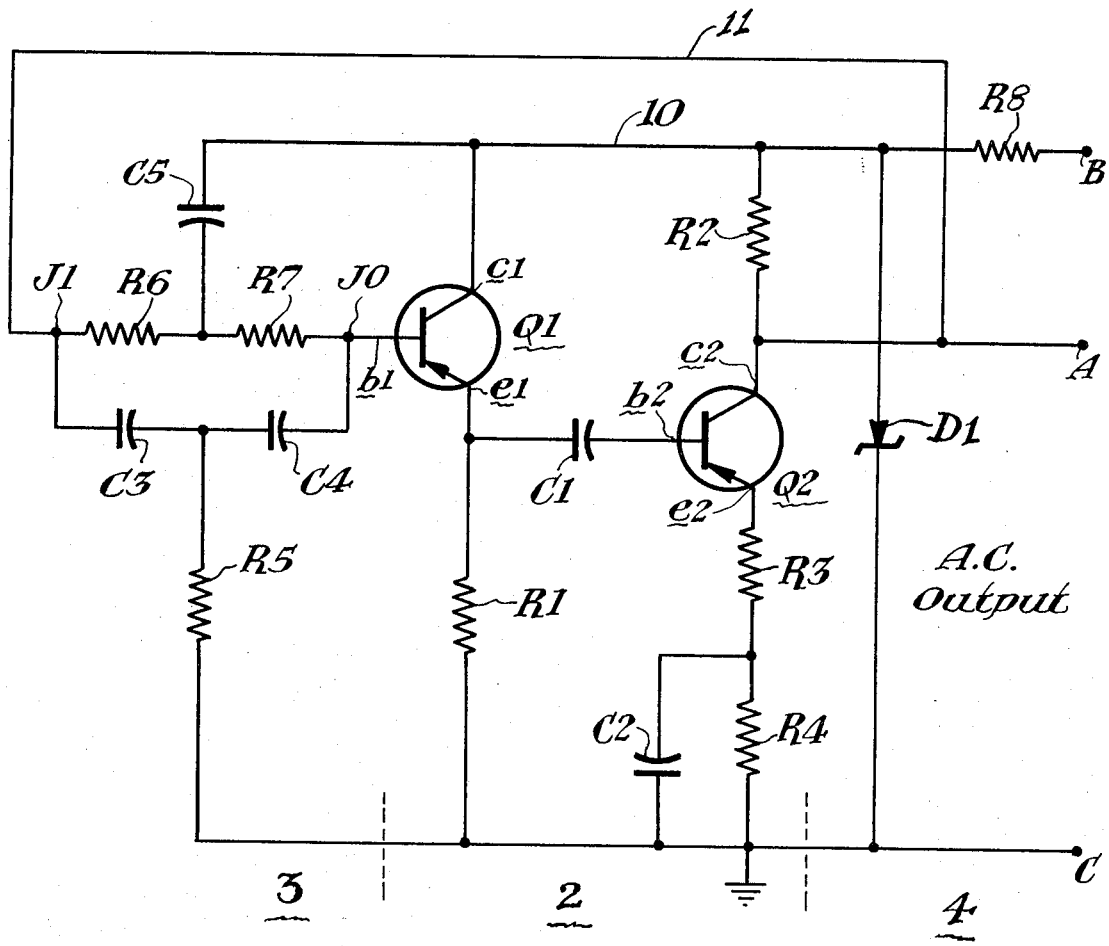

VITAL LEVEL DETECTOR

My invention relates to a vital solid-state level detector and, more particularly, to a fail-safe electronic circuit arrangement employing a multistage amplifier, a phase shift twin-tee network and a variable impedance device for producing an a.c. output signal when and only when the amplitude of a d.c. input exceeds a predetermined value.

In various types of automatic signal and control systems, safety is given the utmost consideration. For example, in vehicle speed detection operations for mass and/or rapid transit systems, it is mandatory to determine the actual speed of a moving vehicle and thereafter compare the actual speed with the preselected speed command request for a given area or section in order to preclude injury to individuals and to prevent damage to equipment. That is, in such systems it is a preemptory safety requirement that under no circumstances should the actual speed of the moving vehicle exceed the preselsected speed command request for any given area. In one particular arrangement, the actual speed of a moving vehicle is derived by suitable speed sensing equipment, such as, an axle driven frequency generator which delivers a.c. signals having a frequency directly proportional to the vehicular velocity. The a.c. signals obtained from the frequency generator are, in turn, applied to a suitable voltage limiter which prevents an excessive voltage swing in either direction and provides that the signal amplitude will be substantially constant. These limited signals are, in turn, applied to a suitable fail-safe low pass filter which is selectively chosen to have an upper frequency limit corresponding to the speed command request for the part icular area. Hence, the filter will only pass signals having frequencies below the upper frequency level. It can be seen that as the vehicle moves from one area to the next, the upper frequency limit may be automatically controlled by varying the filter components and their values, or by selecting one of a plurality of low pass filter circuits in accordance with a prescribed command request for each given area. The a.c. output signals taken from the low pass filter may, in turn, be converted by a fail-safe rectifier to a d.c. output voltage which is proportional thereto. Accordingly, if it is desired to ensure that a vehicle is proceeding at a speed below some predetermined value, it is merely necessary to measure the amplitude of the d.c. output signals supplied by the rectifier. However, as in all vital portions of such a speed command system, this measuring function must be performed by fail-safe apparatus which will not provide an output signal when the vehicle is moving in excess of the preselected speed command request. That is, it is of utmost importance to exercise extreme care in designing and constructing each specific portion of the apparatus in order to maintain the security and integrity of the overall system. Accordingly, it is readily apparent that the detecting apparatus must operate in a fail-safe manner so that any conceivable or foreseeable failure will result in a condition at least as restrictive and preferably more restrictive than that preceding the failure. For example, in such apparatus a circuit malfunction or a component failure should not be permitted to erroneously simulate or indicate a condition for holding or maintaining a vehicle's speed, and normally it is preferred that the failure should either provide a warning such as flashing a light, sounding a buzzer, or initiating a braking action for stopping the vehicle. Thus, in order to ensure the highest degree of safety to individuals as well as to the apparatus, it is necessary and essential that under no circumstances will a failure cause or be capable of simulating a true or valid speed indication.

Accordingly, it is an object of my invention to provide a new and improved vital circuit arrangement.

A further object of my invention is to provide a unique voltage level detector circuit which operates in a fail-safe manner.

Yet another object of my invention is to provide an improved vital level detector for sensing the amplitude of a d.c. input and only producing an a.c. output when the amplitude of the d.c. input exceeds a predetermined level.

Still another object of my invention is to provide a fail-safe detector circuit arrangement for measuring an input and for providing an output when and only when the amplitude of the input exceeds a preselected value.

Still yet another object of my invention is to provide a vital amplitude level detector employing a voltage breakdown device for varying the impedance value in one leg of a twin-tee network which provides feedback for an amplifier circuit.

Still a yet further object of my invention is to provide a transistorized level detector which operates in a fail-safe manner to provide an output voltage when and only when an input exceeds a predetermined value.

A still further object of my invention is to provide an amplifier having a feedback loop which includes a twin-tee network and a Zener diode that allows an a.c. output to be produced when a d.c. input causes the Zener diode to break down and assume a low impedance condition.

Still another object of my invention is to provide a fail-safe circuit arrangement which is simple in construction, economical in use, and efficient and reliable in operation.

Briefly, the vital solid state level detector employs a multistage feedback transistor amplifier, a phase-shift R-C twin-tee network, and a shunt type voltage regulator. The multistage feedback transistor amplifier includes a common collector input stage and a common-emitter output stage. One leg formed by a first resistor and a first capacitor of the R-C twin-tee network is connected to the collector electrode of the common emitter output stage. A second leg formed by a second resistor and a second capacitor of the R-C twin-tee network is connected to the base electrode of the common-collector input stage. A third leg of the R-C twin-tee network is formed by a third resistor and a third capacitor. The shunt voltage regulator includes a current limiting resistor and a Zener diode. The Zener diode is connected in series with the third capacitor of the R-C twin-tee network and normally exhibits a high impedance so that there is not sufficient regenerative feedback at any frequency to sustain oscillations. However, when a predetermined value of d.c. potential is applied across the Zener diode it breaks down and becomes conductive. The conduction of the Zener diode is accompanied by a sudden reduction in its impedance value. The reduced impedance condition causes a dramatic increase in the amount of regeneration at a predetermined center frequency. Thus, the multi-stage amplifier produces an output so that a.c. signals will be available on the output terminals when and only when the d.c. potential exceeds the predetermined value.

The foregoing objects and other attendant features and advantages will be more readily appreciated as the subject invention becomes better understood by reference to the following detailed description when considered in conjunction with the accompanying drawing wherein:

The single FIGURE is a schematic circuit diagram of a vital solid-state level detector in accordance with the teachings of the present invention.

As shown, the vital or fail-safe electronic detecting circuit, generally characterized by numeral 1, includes a two-stage phase inverting amplifier 2, an R-C twin-tee network 3, and a shunt voltage regulator 4.

The amplifier 2 includes a first input stage having a PNP transistor Q1 and a second output stage having a PNP transistor Q2. The input amplifier stage including transistor Q1 is connected in a common-collector or emitter follower configuration in order to achieve impedance matching, namely, providing a relatively high input impedance while exhibiting a suitable low output impedance. The output amplifier stage including transistor Q2 is connected in a common-emitter configuration so that phase inversion occurs, namely, the input signal voltage is reversed 180 degrees in passing through the transistor of the output amplifier. The transistor Q1 includes an emitter electrode $e1$, a collector electrode $c1$, and a base electrode $b1$. The emitter electrode $e1$ of transistor Q1 is connected to a reference potential, such as, ground, via resistor R1. The collector electrode $c1$ of transistor Q1 is directly connected to common d.c. supply conductor or lead 10 or to another suitable voltage supply source. The base electrode $b1$, which forms the input of the amplifier, is connected to an output terminal JO of the twin-tee network 3, as will be described in greater detail hereinafter. The output from transistor Q1 is derived from emitter electrode $e1$ and is coupled to the base electrode $b2$ of output amplifying transistor Q2 via a d.c. blocking capacitor C1. The collector electrode $c2$ of transistor Q2 is connected to d.c. potential lead 10 via resistor R2. The emitter electrode $e2$ of transistor Q2 is coupled to the reference terminal or ground through series connected resistors R3 and R4. A bypass capacitor C2 is connected in parallel with resistor R4 to prevent a.c. degeneration. However, the inclusion of resistor R4 increases the d.c. stability of the amplifier circuit. In a somewhat similar manner, resistor R3 stabilizes the operation of the amplifier and also establishes the a.c. gain of the amplifier circuit. An output voltage in the form of a.c. signals is derived from across terminals A and C. As shown, the terminal A is directly connected to the collector electrode $c2$ of transistor Q2 and the terminal C is in fact ground.

The collector electrode $c2$ is also connected to input terminal JI of the parallel or twin-tee network 3 via conductor or lead 11. The presently described twin-tee network 3 operates as a band-pass center frequency filter when the circuit parameters exhibit the originally designed resonant frequency characteristics. However, a change of impedance in a given element or arm in the twin-tee network 3 will upset its resonant qualities and cause the network 3 to become a center frequency rejection filter. The network 3 includes a first tee having a pair of series connected impedances or capacitors C3 and C4 connected between input terminal JI and output terminal JO. The first tee also includes a shunt impedance or resistor R5 which is connected from the junction of capacitors C3 and C4 to ground. The network 3 includes a second tee having a pair of series connected impedances or resistors R6 and R7. The second tee also includes a shunt impedance or capacitor C5 which is connected from the junction of resistors R6 and R7 to ground. In other words, the capacitor C3 and resistor R6 are connected in common to junction point or terminal JI and from the input arm of the network while capacitor C4 and resistor R7 are connected in common to junction point or terminal JO and form the output arm of the network. The two remaining elements, namely, capacitor C5 and resistor R5 form the common arm of the twin-tee network. As previously mentioned, the input junction point JI is directly connected to the collector electrode $c2$ so that a portion of the output signals is fed back under certain conditions. In the instant case, the twin-tee network is preferably symmetrical in that the capacitance values of capacitors C3 and C4 are equal and in that the resistance values of resistors R6 and R7 are equal. Further, the parallel-tee network is designed to be an unbalanced type of circuit in that the resistance value of resistor R5 is not a factor of resistor R6 or R7 and in that the capacitance value of capacitors C3 and C4 is not a factor of capacitor C5. It has been found that a twin-tee network having these characteristics, under certain conditions, will pass a given frequency signal and will phase shift the selected signal 180 degrees. Thus, the unique phase inversion of the imperfectly nulled twin-tee network permits its usage in a positive type of feedback amplifier circuit to produce a.c. oscillations across output terminals A and C, as will be described.

It will be appreciated that oscillations cannot occur unless sufficient d.c. bias voltage is available for powering the two transistor amplifying stages. As previously mentioned, the vital level detector 1 operates in a fail-safe manner to measure the amplitude of a d.c. input voltage which is representative of the actual speed of the moving vehicle. That is, the d.c. voltage supplied by the speed sensing apparatus is applied to the input terminals B and C. The applied d.c. voltage is stabilized by the shunt regulator comprising a series-connected current limiting resistor R8 and breakdown device D1, such as, a Zener diode. As illustrated, a d.c. voltage terminal B is applied to one end of resistor R8 while one electrode of the Zener diode D1 is directly connected to ground. That is, current limiting resistor R8 has one of its ends connected to the input terminal B and the other end connected to the anode of the Zener diode D1. The cathode of Zener diode D1 is connected to the other input terminal C, namely, ground.

As previously mentioned, the common arm of the twin-tee network 3 is made up of resistor R5 and capacitor C5. As previously mentioned, it will be noted that resistor R5 is directly connected to a common point, namely, ground, while it can be seen that capacitor C5 is connected to ground through Zener diode D1 of regulator 4. It will be appreciated that a nonconducting Zener diode exhibits a very high impedance while a conducting Zener diode offers litte resistance to the flow of current. Thus, when the Zener diode is conducting, the capacitor C5 is effectively connected to the common point, namely, ground, as is resistor R5. As will be described presently, by suitably controlling the impedance value in a common arm of the twin-tee, in this case the arm having capacitor C5, the amount of regenerative feedback and, in turn, the amount of given losses therein may be employed to control the conductuve condition of the circuit. That is, a high value of impedance appearing in the capacitive portion of the common capacitive arm will materially decrease the amount of positive feedback due to increased losses so that a.c. oscillation will not appear across output terminals A and C.

In describing the operation, it will be initially assumed that the actual speed of the vehicle has increased to a point beyond the predetermined speed command request so that the circuit operation may be analyzed under this condition. Under this condition, the axle generator now produces a signal of increased frequency. These high frequency signals are greatly attenuated due to the inherent rejection characteristics of the low pass filter so that the d.c. output produced by the electrified network is proportionately reduced at this time. Accordingly, the level of the d.c. input applied to terminals B and C is substantially below the Zener threshold or breakdown voltage of the diode D1. However, if an insufficient magnitude of d.c. voltage is applied across the Zener diode D1, the diode will not conduct and will exhibit high dynamic impedance. As previously mentioned, the diode D1 interconnects the capacitor C5 of the common arm to ground. Accordingly, the circuit parameters, and particularly the shunt capacitive characteristics of the common arm, are no longer tuned to the natural frequency of oscillations and, therefore, there is insufficient regenerative feedback at the center frequency. Thus, under this condition, no a.c. oscillations are available on the output terminals A and C. Hence, the underspeed relay becomes deenergized, thereby signifying that the vehicle is now proceeding at a speed above the preselected speed command request for the given area. The deenergization of the underspeed relay may, in turn, cause the energization of a suitable alarm, such as, lighting a lamp or sounding a buzzer and initiating an automatic braking action to slow down and/or stop the vehicle entirely.

Let us now assume that the vehicle is proceeding at or below the preselected speed command request so that the d.c. signals generated by the speed sensing apparatus and applied to the input terminals B and C are of a preselected or predetermined value. As previously mentioned, the speed sensing apparatus is highly capable of generating a sufficient level of d.c. voltage when the vehicle is proceeding at a speed lower than a preselected speed command request for a particular area. The voltage breakdown characteristics of the Zener diode D1 are appropriately selected to require a potential level substantially equal to the voltage level of the sensing apparatus when the vehicle is moving below a preselected speed command request. Accordingly, under this condition a d.c. input voltage is of a sufficient magnitude to cause Zener diode D1 to break down, thereby causing the diode to conduct and exhibit a low dynamic impedance. With the Zener diode D1 conducting, a low impedance path is established for the capacitor common arm of the resonant twin-tee filter circuit so that sufficient feedback voltage and a 180 degree phase shift occur for the transistor amplifier. Accordingly, with sufficient regenerative feedback, the transistor amplifier goes into oscillation and produces a.c. output signals on the output terminals A and C.

Further, since the voltage across the Zener diode D1 remains substantially constant even there may be a wide range of voltage and current changes. Thus, the various biasing voltages supplied by the voltage regulator ensure stable operation of the transistor amplifier. In addition, it has been found that oscillations occur almost exactly at the knee of the Zener breakdown curve so that a sharp and highly accurate level detector is realized. As is well known, the a.c. output power which is available at the collector electrode C2 is a function of the amplifier gain minus the feedback power. It will be appreciated that the a.c. voltage on output terminals A and C may be suitably amplified and rectified and, in turn, may be employed to energize the underspeed relay, thereby indicating that the speed of the vehicle is not in excess of the pre-selected command request.

As previously mentioned, the level detecting circuit operates in a fail-safe manner in that no conceivable critical component or circuit failure is capable of producing an a.c. output on the output terminals A and C except when the Zener diode D1 conducts and assumes a low impedance condition. It will be noted, if the Zener diode D1 becomes short-circuited, the necessary biasing and supply voltages are not available and, therefore, the amplifier is incapable of going into oscillation. If the Zener diode D1 becomes open-circuited, it is quite apparent that a required low impedance path between the shunt capacitor portion of the twin-tee and ground is not present so that oscillations cannot occur and no a.c. output signals will be available at the output terminals A and C. If the Zener diode D1 becomes leaky or conducts at some voltage lower than the normal breakdown voltage, the dynamic impedance exhibited by the diode is still generally sufficient to cause an appreciable amount of degeneration and lacks the necessary phase shift so that oscillations will not occur. An open-circuit failure of the current limiting resistor is obviously a safe condition. Normally, fail-safeness is based on the premise that critical resistors or resistor elements cannot become short-circuited due to the particular types of resistors, namely, carbon composition of a particular manufacturer employed in circuits which must operate in a fail-safe manner. It will be noted that the various other components and elements constituting the amplifier circuit will either fail in a safe manner or destroy the circuit integrity to the point where oscillations will not occur. Accordingly, it will be observed that the presently described level detector operates in a fail-safe manner so that a.c. output is available only at the terminals A and C when and only when a predetermined value of d.c. input is applied to the input terminals B and C.

It will be appreciated that while this invention finds particular utility in speed control systems, it is readily evident that the invention is not merely limited thereto but may be employed in various other systems and apparatus which require the security and safety inherent in the invention, but regardless of the manner in which the invention is used, it is understood that various alterations may be made by a person skilled in the art without departing from the spirit and scope of this invention. It will also be apparent that other modifications and changes can be made in the presently described invention, and therefore it is understood that all changes equivalents, and alterations within the spirit and scope of this invention are herein meant to be included as set forth in the appended claims.

Having thus described my invention, what I claim is:

1. A fail-safe voltage level detector comprising, an amplifier having an input and an output circuit, a regenerative feedback loop connected between said input circuit and said output circuit of said amplifier, said feedback loop including a twin-tee network, a voltage responsive variable impedance device, a source of d.c. operating potential adapted to be connected across said voltage responsive variable impedance device, said twin-tee network having a capacitive leg connected to one end of said voltage responsive variable impedance device and having a resistive leg connected to the other end of said voltage responsive variable impedance device, said twin-tee network phase shifts a given frequency signal substantially a 180 degrees when and only when said d.c. operating potential source is capable of causing said voltage responsive variable impedance device to become conductive and to assume a low impedance condition so that said d.c. operating potential and a.c. feedback signals are supplied to said amplifier via said voltage responsive variable impedance device.

2. A fail-safe detector as defined in claim 1, wherein said amplifier is a multi-stage amplifying circuit.

3. A fail-safe detector as defined in claim 1, wherein said twin-tee network includes a plurality of resistors and capacitors connected in series and parallel relationship.

4. A fail-safe detector as defined in claim 1, wherein a pair of resistors connected in series and a capacitor connected to the resistor junction point form one tee network and a pair of capacitors connected in series and a resistor connected to the capacitor junction point form the other tee network.

5. A fail-safe detector as defined in claim 4, wherein said voltage responsive variable impedance device is connected in series with said capacitor of said one tee network.

6. A fail-safe detector as defined in claim 4, wherein said amplifier includes a pair of cascaded transistors one of which is connected in a common-collector configuration and the other of which is connected in a common-emitter configuration.

7. A fail-safe detector as defined in claim 1, wherein said voltage responsive variable impedance device is a shunt connected Zener diode.

8. A fail-safe detector as defined in claim 1, wherein said voltage responsive variable impedance device is a shunt connected voltage breakdown diode.

9. A fail-safe detector as defined in claim 1, wherein the impedance of one leg of said twin-tee network is reduced when a predetermined value of d.c. potential is applied across said voltage responsive variable impedance device which is a shunt connected regulator so that sufficient feedback occurs and said amplifier produces a.c. output signals.

10. A fail-safe detector as defined in claim 1, wherein one leg formed by a first resistor and a first capacitor of said twin-tee network is connected to the collector electrode of a common-emitter output amplifier stage, a second leg formed by a second resistor and a second capacitor of said twin-tee network is connected to the base electrode of a common-collector input amplifier stage and a third leg formed by a third resistor and a third capacitor of said twin-tee network is connected to ground.

* * * * *